(12) United States Patent
Ludin et al.

(10) Patent No.: US 9,016,448 B2
(45) Date of Patent: Apr. 28, 2015

(54) ENERGY ABSORBING DEVICE

(71) Applicant: The Boeing Company, Chicago, IL (US)

(72) Inventors: Douglas R. Ludin, Malvern, PA (US); Matthew L. Renninger, Havertown, PA (US)

(73) Assignee: The Boeing Company, Chicago, IL (US)

( * ) Notice: Subject to any disclaimer, the term of this patent is extended or adjusted under 35 U.S.C. 154(b) by 156 days.

(21) Appl. No.: 13/685,812

(22) Filed: Nov. 27, 2012

(65) Prior Publication Data

US 2014/0144740 A1  May 29, 2014

(51) Int. Cl.
*F16F 7/12* (2006.01)

(52) U.S. Cl.
CPC .............. *F16F 7/12* (2013.01); *Y10T 29/49826* (2015.01); *F16F 7/125* (2013.01)

(58) Field of Classification Search
CPC ............. F16F 7/12; F16F 7/121; F16F 7/123; F16F 7/125; B60R 19/34; B60R 21/04
USPC .................... 188/377, 322.19, 371, 374, 376; 29/428; 267/140.13, 136, 141.1, 153
See application file for complete search history.

(56) References Cited

U.S. PATENT DOCUMENTS

| | | | |
|---|---|---|---|
| 2,391,275 A * | 12/1945 | Shaw | 74/581 |
| 3,759,351 A * | 9/1973 | Purple | 188/377 |
| 4,336,868 A | 6/1982 | Wilson et al. | |
| 4,593,870 A | 6/1986 | Cronkhite et al. | |
| 4,738,339 A | 4/1988 | Taylor | |
| 6,274,211 B1 * | 8/2001 | Detzner | 428/36.9 |
| 6,601,886 B1 | 8/2003 | Thayer | |
| 6,776,370 B2 * | 8/2004 | Struzik et al. | 244/17.27 |
| 8,136,758 B2 | 3/2012 | Steinke et al. | |
| 2004/0145098 A1 * | 7/2004 | Thaler | 267/33 |
| 2005/0173216 A1 * | 8/2005 | Meernik et al. | 188/371 |
| 2008/0036242 A1 * | 2/2008 | Glance et al. | 296/187.09 |
| 2009/0071590 A1 | 3/2009 | Chien et al. | |
| 2009/0151595 A1 * | 6/2009 | Kontetzki | 105/8.1 |

* cited by examiner

*Primary Examiner* — Anna Momper
*Assistant Examiner* — San Aung
(74) *Attorney, Agent, or Firm* — Walters & Wasylyna LLC

(57) ABSTRACT

An energy absorbing device including a housing having a first end and a second end longitudinally opposed from the first end, a crushing member positioned proximate the first end, a stopping member longitudinally spaced apart from the crushing member, an energy absorbing member positioned between the crushing member and the stopping member, and a linking member connected to the crushing member.

15 Claims, 12 Drawing Sheets

ENERGY ABSORBING DEVICE

FIELD

The present disclosure is generally related to energy absorbing mechanisms and, more particularly, to an energy absorbing device having a crushable energy absorbing member to absorb energy in both tension and compression.

BACKGROUND

Various energy absorbing devices are used to dissipate kinetic energy as a result of an impact or other sudden forces. Such energy absorbing devices typically use methods such as hysteresis of a structural member, such as compression or stretching of rubber, bending of steel springs, cold-working of metal wire, or twisting of torsion bars; fluid friction, such as the flow of fluid through a narrow orifice; compression of a gas, such as a pneumatic shock absorber; controlled textile failure, such as ripping of stitching; and the like.

However, these devices and methods typically cannot match the amount of specific energy (i.e., energy per unit of mass) found in the controlled crushing of a composite tube. Further, these devices and methods are designed to absorb energy in only one direction, either in the tension direction or the compression direction.

Accordingly, those skilled in the art continue with research and development efforts in the field of energy absorbing devices to dissipate kinetic energy in response to a load or impact force.

SUMMARY

In one embodiment, the disclosed energy absorbing device may include a first end having a crushing member, a stopping member longitudinally spaced apart from the crushing member, an energy absorbing member positioned between the crushing member and the stopping member; a second end longitudinally opposed from the first end; and a linking member connected between the crushing member and the second end.

In another embodiment, the disclosed energy absorbing device may include a housing having a first end and a second end longitudinally opposed from the first end, a crushing member positioned proximate the first end, a stopping member longitudinally spaced apart from the crushing member, an energy absorbing member positioned between the crushing member and the stopping member, and a linking member connected to the crushing member.

In another embodiment, the disclosed energy absorbing device may include a housing having a first end longitudinally opposed from a second end and defining an internal volume; a longitudinally moveable crushing member received in the internal volume proximate the housing first end; a longitudinally moveable stopping member received in the internal volume proximate the housing second end; an end fitting in releasable contact with the stopping member proximate the housing second end; a linking member having a first end longitudinally opposed from a second end, wherein the first end of the linking member is connected to the crushing member, and wherein the second end of the linking member is connected to the end fitting; and an energy absorbing member received in the internal volume, wherein the energy absorbing member is extending between the crushing member and the stopping member.

In another embodiment, the disclosed energy absorbing device may include a housing having a first housing having a first end longitudinally opposed from a second end and a second housing having a first end longitudinally opposed from a second end; wherein the second housing is moveably coupled to the first housing to define an internal volume; a longitudinally moveable crushing member received in the internal volume proximate the housing first end; a longitudinally moveable stopping member received in the internal volume proximate the second housing second end; an end fitting in releasable contact with the stopping member proximate the second housing second end; a linking member having a first end longitudinally opposed from a second end, wherein the first end of the linking member is connected to the crushing member, and wherein the second end of the linking member is connected to the end fitting; and an energy absorbing member received in the internal volume, wherein the energy absorbing member is extending between the crushing member and the stopping member; and, wherein the stopping member may include an inwardly extending lip of the second housing second end.

In another embodiment, disclosed is a method of absorbing energy in response to a compression force, the method may include the steps of: (1) providing a first structural member, (2) providing a second structural member, (3) providing at least one energy absorbing member that may include a first end having a crushing member, a stopping member longitudinally spaced apart from the crushing member, an energy absorbing member positioned between the crushing member and the stopping member, a second end longitudinally opposed from the first end, and a linking member connected between the crushing member and the second end, (4) coupling the energy absorbing member between the first and second structural members, (5) applying a compression force between the first and second structural members, (6) urging the first and second ends together in response to the compression force, and (7) crushing the energy absorbing member between the crushing member and the stopping member to dissipate kinetic energy.

In yet another embodiment, disclosed is a method of absorbing energy in response to a tension force, the method may include the steps of: (1) providing a first structural member, (2) providing a second structural member, (3) providing at least one energy absorbing member that may include a first end having a crushing member, a stopping member longitudinally spaced apart from the crushing member, an energy absorbing member positioned between the crushing member and the stopping member, a second end longitudinally opposed from the first end, and a linking member connected between the crushing member and the second end, (4) coupling the energy absorbing member between the first and second structural members, (5) applying a tension force between the first and second structural members, (6) urging the first and second ends away from each other in response to the tension force, and (7) crushing the energy absorbing member between the crushing member and the stopping member to dissipate kinetic energy.

Other embodiments of the disclosed energy absorbing device will become apparent from the following detailed description, the accompanying drawings and the appended claims.

DETAILED DESCRIPTION

Figure 1:
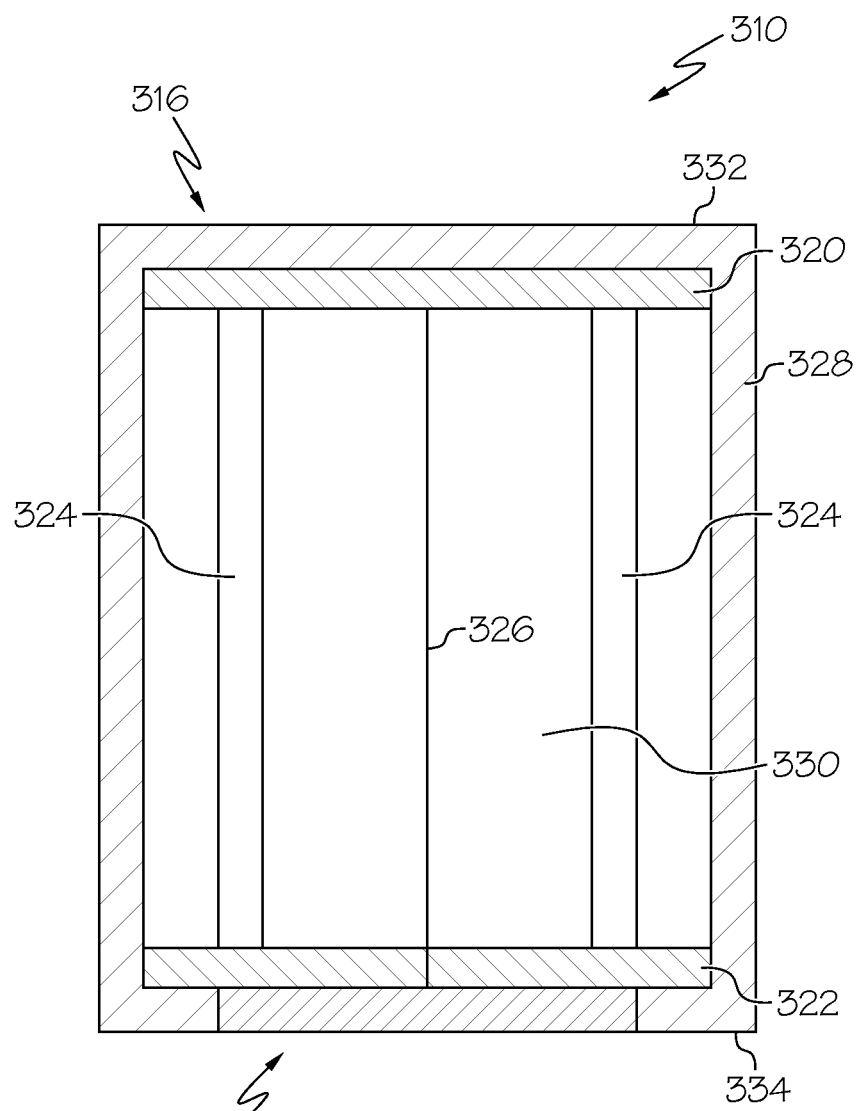
FIG. 1 is a schematic view of one embodiment of the disclosed energy absorbing device.

The following detailed description refers to the accompanying drawings, which illustrate specific embodiments of the disclosure. Other embodiments having different structures and operations do not depart from the scope of the present disclosure. Like reference numerals may refer to the same element or component in the different drawings.

Figure 2:
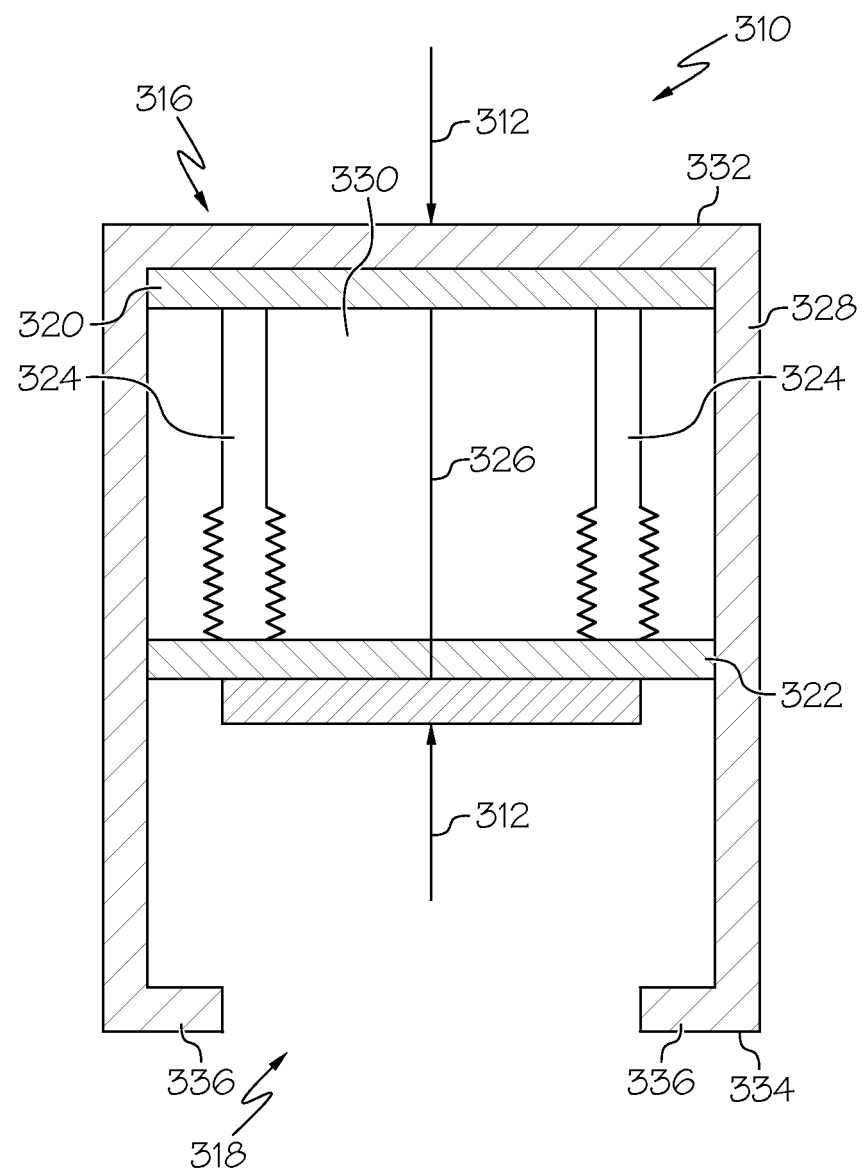
FIG. 2 is a schematic view of the disclosed energy absorbing device of FIG. 1 depicted in response to a compression force.
Figure 3:
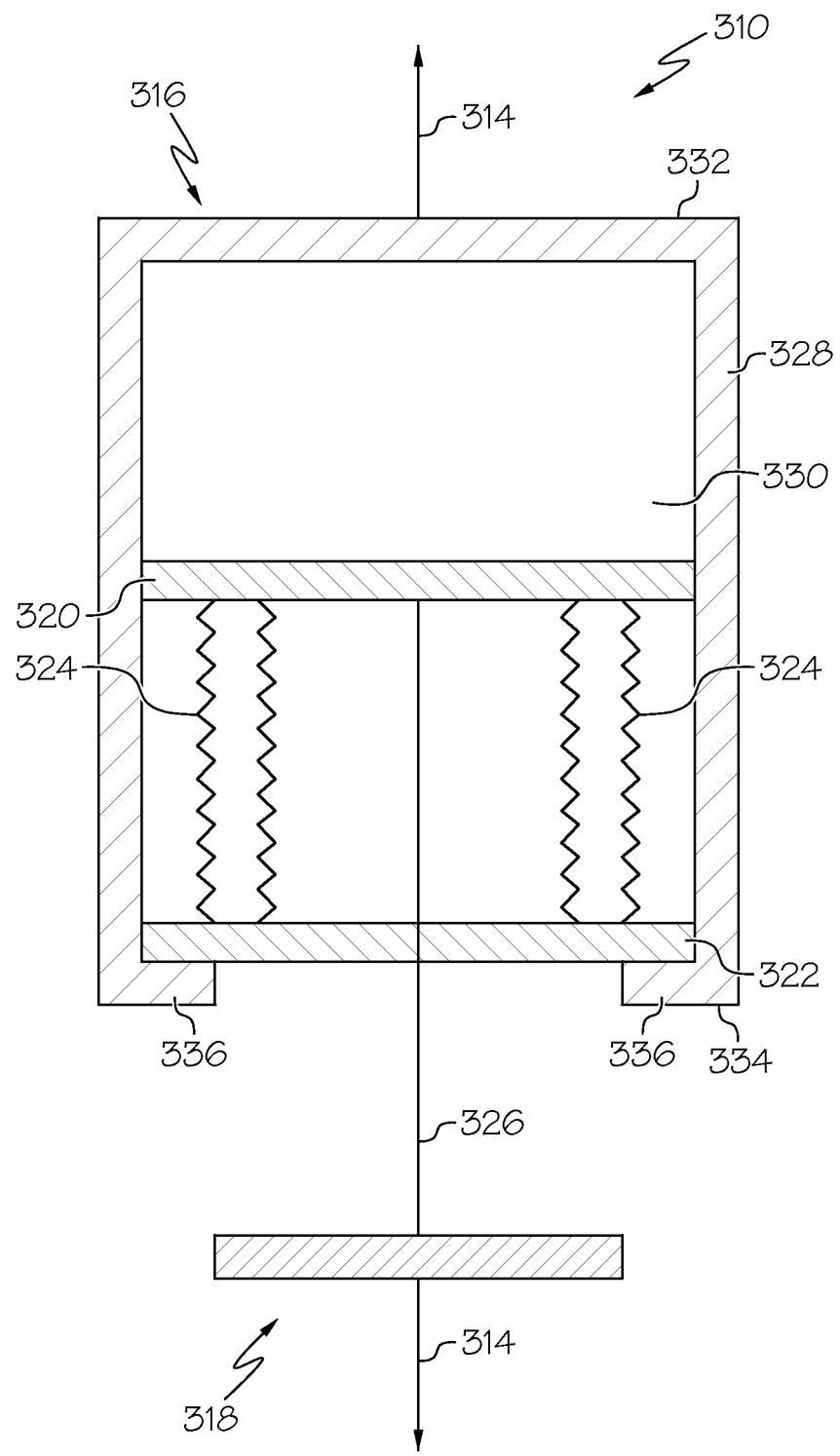
FIG. 3 is a schematic view of the disclosed energy absorbing device of FIG. 1 depicted in response to a tension force.

Referring to FIGS. 1-3, one embodiment of the disclosed energy absorbing device, generally designated 310, may include functional equivalents to both a strut and a tie (i.e., resisting and absorbing energy from both compression forces 312 (FIG. 2) and tension forces 314 (FIG. 3)). The energy absorbing device 310 may be referred to throughout the present disclosure generally as energy absorber, absorbing device, or device.

The device 310 may include a housing 328 having a first end 316 and a longitudinally opposed second end 318. The first end 316 and second end 318 may be longitudinally movable relative to one another in response to an applied compression force 312 (FIG. 2) or an applied tension force 314 (FIG. 3). A longitudinally movable crushing member 320 may be disposed between the first end 316 and the second end 318. A longitudinally moveable stopping member 322 may be disposed between the first end 316 and the second end 318 and longitudinally spaced apart from the crushing member 320. An energy absorbing member 324 may be disposed between the crushing member 320 and the stopping member 324. A linking member 326 may be connected to the crushing member 320.

The crushing member 320 may be positioned proximate the first end 316 in a suitable manner to provide a physical limit to the linear motion of the crushing member 320 in a direction away from the stopping member 322. The stopping member 322 may be positioned proximate the second end 318 in a suitable manner to allow longitudinal motion of the stopping member 322 relative to the first end 316. In response to an applied compression force 312, linear motion of the first end 316 may be transferred to linear motion to the crushing member 320 and linear motion of the second end 318 may be transferred to linear motion to the stopping member 322 (i.e., driving the crushing member 320 and the stopping member 322 toward one another).

The crushing member 320 may also be operatively coupled to the second end 318 in a suitable manner as to provide longitudinal motion of the crushing member 320 relative to the first end 316, such as via the linking member 326. The stopping member 322 may be operatively coupled to the first end 316 in a suitable manner to provide a physical limit to the linear motion in a direction away from the crushing member 320. In response to an applied tension force 314, linear motion of the second end 318 may be transferred to linear motion to the crushing member 320 and linear motion of the first end 316 may be transferred to linear motion to the stopping member 322 (i.e., driving the crushing member 320 and the stopping member 322 toward one another).

As an illustrative embodiment, the first end 316 of the housing 328 may be associated with a first housing portion and the second end 318 of the housing may be associated with a second housing portion. The second end 318 may be a mounting plate or similar rigid body. The housing 328 may include an internal volume 330 to operatively contain the crushing member 320, the stopping member 322 and the energy absorbing member 324. The first housing portion of the housing 328 may include a first end 332 and a longitudinally opposed second end 334. The first housing portion first end 332 and the second housing portion (second end 318) of the device 310 may be fastened, mounted, or otherwise attached to opposing structural members that may experience impact forces.

When in an unloaded condition (FIG. 1), the crushing member 320 may be received within the internal volume 330 proximate the first housing portion first end 332. The stopping member 322 may be received within the internal volume 330 proximate the first housing portion second end 334. The energy absorbing member 324 may be received within the internal volume 330 between the crushing member 320 and the stopping member 322. The energy absorbing member 324 may be in contact with the crushing member 320 or the stopping member 322 or both the crushing member 320 and the stopping member 322.

In response to the applied compression force 312 (FIG. 2), the first end 316 and second end 318 may be forced toward one another. Correspondingly, the first housing portion first end 332 may longitudinally drive the crushing member 320 toward the stopping member 322 (i.e., in the direction of the compression force 312). The second end 318 may longitudinally drive the stopping member 322 toward the crushing member 320 (i.e., in the direction of the compression force 312). The energy absorbing member 324 may be crushed between the crushing member 320 and the stopping member 322 to attenuate and absorb kinetic energy.

In response to the applied tension force 314 (FIG. 3), the first end 316 and second end 318 may be forced away from one another. Correspondingly, the first end 316 may longitudinally drive the stopping member 322 toward the crushing member 320 (i.e., in the direction of the tension force 314). The second end 318 may longitudinally drive the crushing member 320 toward the stopping member 322 (i.e., in the direction of the tension force 314) via the linking member 326. The energy absorbing member 324 may be crushed between the crushing member 320 and the stopping member 322 to attenuate and absorb kinetic energy.

In the given configuration, the energy absorbing member 324 may be crushed between the crushing member 320 and the stopping member 322 to absorb energy, whether the device 310 is acted upon by compression forces or tension forces.

It can be appreciated by one skilled in the art that the housing 328 may include various structural configurations suitable to operatively contain the crushing member 320, the stopping member 322 and the energy absorbing member 324 such that the crushing member 320 and stopping member 322 may be longitudinally moveable relative to the housing 328 in response to forces applied to the first end 316 and second end 318 of the device 310.

For example, the housing 328 may include rigid sidewalls, a closed first housing portion first end 332, and an open first housing portion second end 334. The closed first housing portion first end 332 may provide the physical motion limit to the crushing member 320 during compression. The open first housing portion second end 334 may include a flange, lip, or other inwardly projecting protrusion 336 to provide the physical motion limit to the stopping member 322 during tension. The open first housing portion second end 334 may also be suitably sized to receive the second end 318 (e.g., second housing portion) of the device 310 for contact with the stopping member 322 during compression. The stopping member 322 may include at least one aperture or other passage way for the linking member 326 to pass through between the crushing member 320 and the second end 318 of the device 310.

As another example, the housing 328 may have flexible or corrugated sidewalls that may be compressed during compression and that may have a series of strengtheners between the first end and second end to prevent over extension during tension (not shown). The sidewalls of the housing 328 may have a tensile strength higher than the compression strength of the energy absorbing member 324. In such an example, the stopping member 322 may be attached to the first housing portion second end 334 and may longitudinally move toward the crushing member 320 as the housing compresses.

Figure 4:
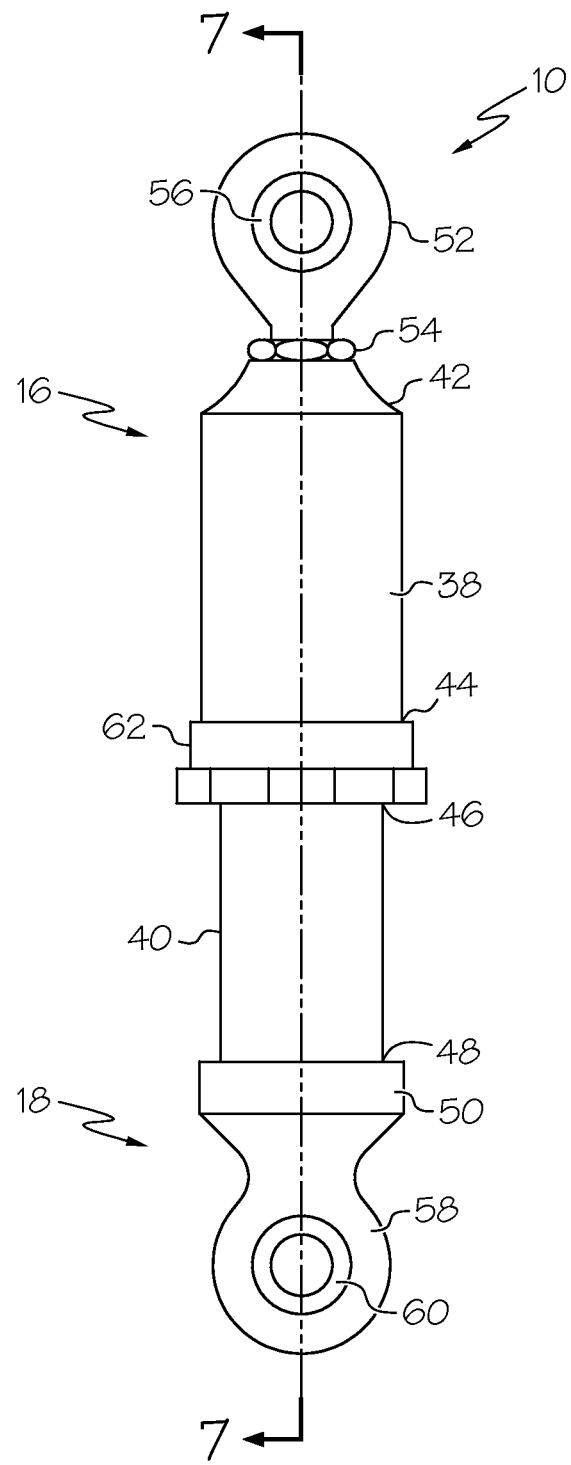
FIG. 4 is a front elevation of another embodiment of the disclosed energy absorbing device.
Figure 5:
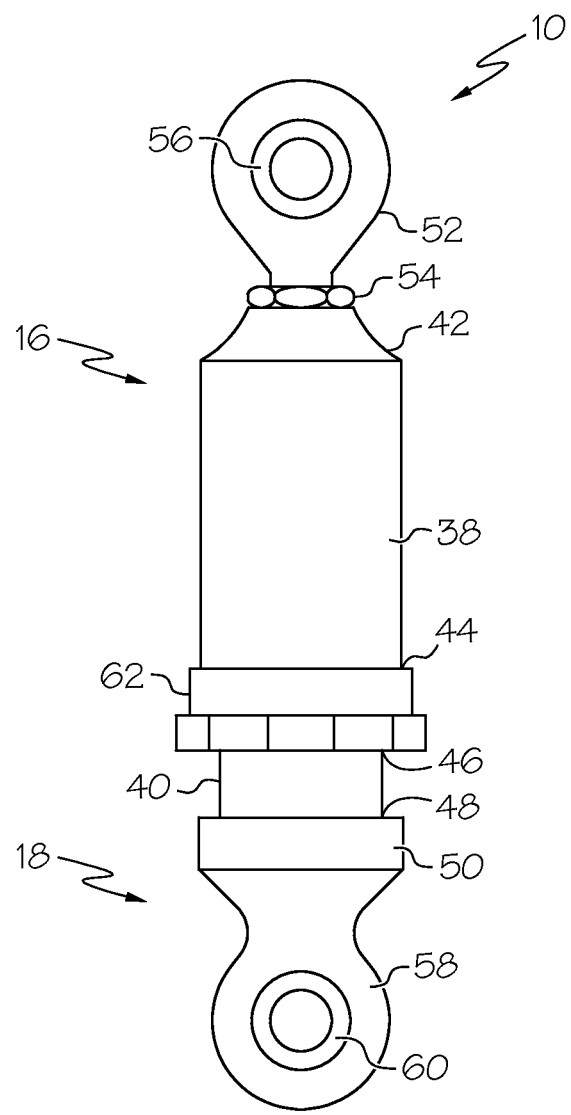
FIG. 5 is a front elevation of the disclosed energy absorbing device of FIG. 4 depicted in a compression stroke.
Figure 6:
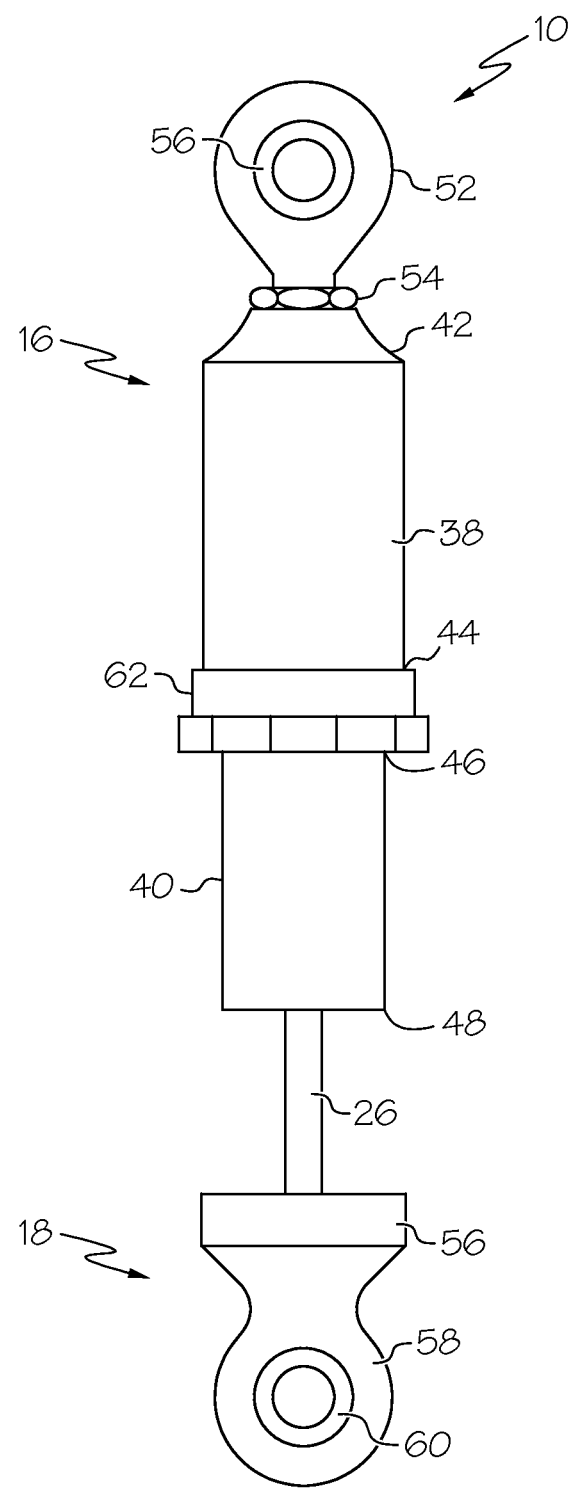
FIG. 6 is a front elevation of the disclosed energy absorbing device of FIG. 4 depicted in a tension stroke.

Referring to FIG. 4-6, in another embodiment of the disclosed energy absorbing device 10, a first (e.g., outer) housing portion 38 may be coupled to a second (e.g., inner) housing portion 40 such that the device 10 has a first end 16 and a second end 18. The first housing portion 38 may include a first (e.g., upper) end 42 and a longitudinally opposed second (e.g., lower) end 44. The second housing portion 40 may include a first (e.g., upper) end 46 and a longitudinally opposed second (e.g., lower) end 48.

Throughout the present disclosure, the first housing portion 38 may be illustrated as being an outer housing and the second housing portion 40 may be illustrated as being an inner housing; however, it can be appreciated by one skilled in the art that the first housing portion 38 may be an inner housing and the second housing portion 40 may be an outer housing and identification as such is not meant to be limiting in any manner. The second end 18 may include an end fitting 50 releasably connected to the second housing portion second end 48. Furthermore, relative terms such as "front" or "rear" or "left" or "right" or "top" or "bottom" or "below" or "above" or "upper" or "lower" or "horizontal" or "vertical" may be used herein to describe a relationship of one element, feature or region to another element, feature or region as illustrated in the figures. It can be appreciated by one skilled in the art that these terms are intended to encompass different orientations of the device in addition to the orientation depicted in the figures.

A first rod end 52 may be directly attached to the first housing portion first end 42. The first rod end 52 may have a threaded end attached to the first housing portion first end 42 (a threaded connection), such as by a jam nut 54 and a first spherical bearing 56 opposite the threaded connection. In use, the first rod end 52 may be coupled to or otherwise attached to a first structural feature that may be acted upon by an external force, for example, between a passenger seat or payload and a frame of an aircraft.

A second rod end 58 may be rigidly attached to the end fitting 50 and may include a second spherical bearing 60. In use, the second rod end 58 may be coupled to or otherwise attached to a second structural feature proximate the first structural feature that may be acted upon by an external force, for example, between a passenger seat or payload and a frame of an aircraft.

As will be described in greater detail herein below, a flanged coupling 62 may attach to the first housing portion second end 44 and contact the second housing portion first end 46 to connect the first housing portion 38 and the second housing portion 40 together to form the housing of the device 10.

Figure 7:
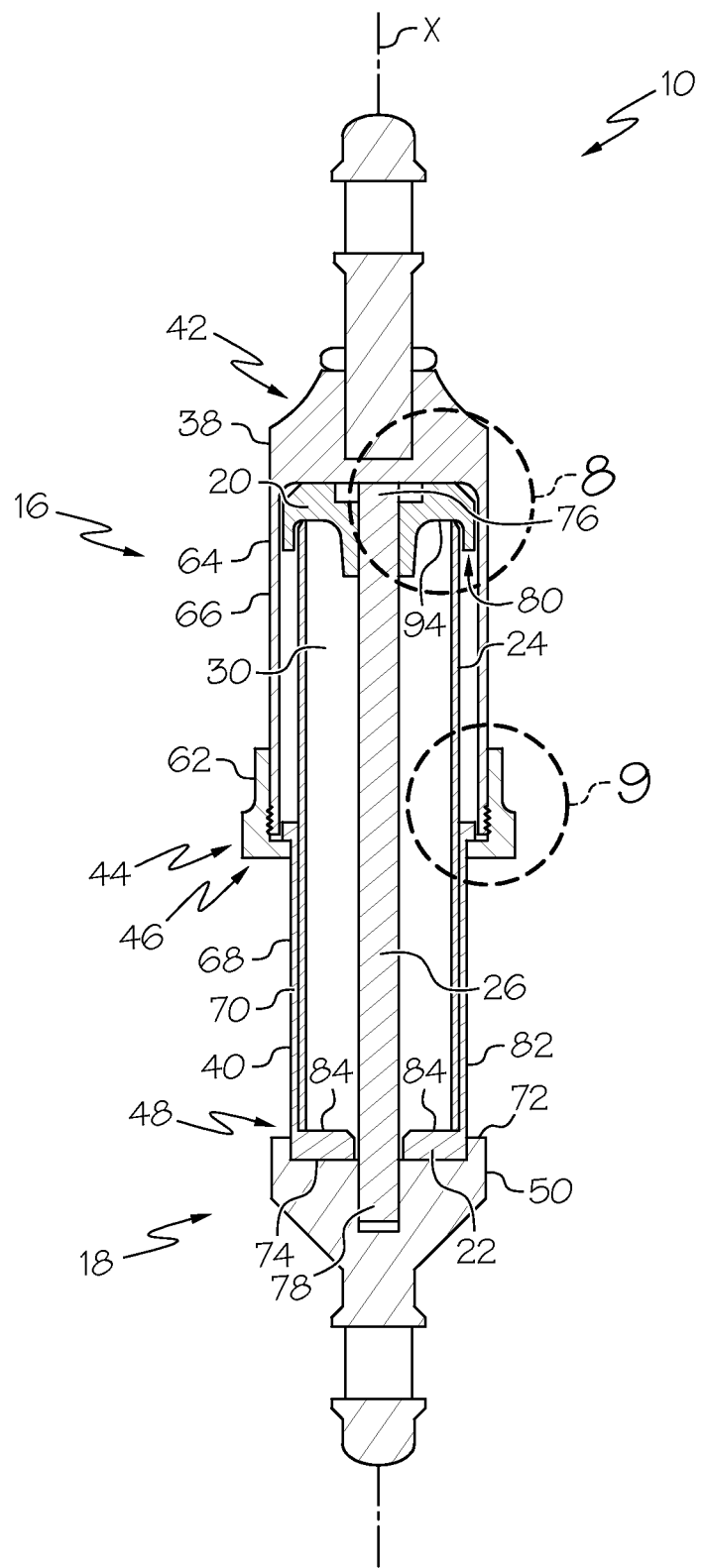
FIG. 7 is a side elevation of the disclosed energy absorbing device of FIG. 4, shown in section.

Referring to FIG. 7, the first housing portion 38 may include a generally tubular body 64 having longitudinally extending sidewalls 66. The first housing portion second end 44 may include an opening generally spanning an inner diameter of the first housing portion 38 to couple (e.g., slidably and/or insertably) the first and second housing portions 38, 40. The second housing portion 40 may include a generally tubular body 68 having longitudinally extending sidewalls 70. The second housing portion first end 46 may include an opening generally spanning an inner diameter of the second housing portion 40. The first housing portion 38 and second housing portion 40 may combine to define the internal volume 30 of the first end 16 of the device 10 for containing the crushing member 20, the stopping member 22, the energy absorbing member 24, and the linking member 26.

In the illustrated embodiment, the stopping member 22 may be the second housing portion second end 48. The second housing portion second end 48 (i.e., the stopping member 22) may include a suitably sized opening to allow the linking member 26 to pass through and extend outwardly from the second housing portion second end 48.

In the illustrated embodiment, the first housing portion 38 and the second housing portion 40 may generally include matching circular cross sectional shapes, where an outer dimension of the second housing portion 40 is in close tolerance with an inner dimension of the first housing portion 38. However, it can be appreciated by one skilled in the art that the first and second housing portions 38, 40 may have other matching cross sectional shapes and the illustrated embodiment is not meant to be limiting in any manner.

The end fitting 50 may be connected (e.g., releasably) to the second housing portion second end 48. The end fitting 50 may include longitudinally protruding sidewalls 72 and a central recessed area 74. The end fitting 50 may be suitably sized to receive and cover over the second housing portion second end 48 when in contact.

The crushing member 20 may be disposed within the internal volume 30 proximate the first housing portion first end 42. As described herein below, the crushing member 20 may be longitudinally (e.g., linearly) movable relative the first end 16 (i.e., within the first housing portion 38 and second housing portion 40).

The linking member 26 may be directly attached at a first (e.g., upper) end 76 to the crushing member 20 and at a second (e.g., lower) end 78 to the end fitting 50 and longitudinally spanning a distance between the crushing member 20 and the end fitting 50. The linking member 26 may include a tension cable, a wire rope, a metallic rod, a composite cable, a chain, a strap, or the like. Furthermore, while only a single linking member 26 may be shown by example, it can be appreciated by one skilled in the art that a plurality of linking members 26 may be utilized with equal benefit and the example embodiment is not meant to be limiting in any manner. Accordingly, the second housing portion second end 48 (i.e., the stopping member 22) may include an appropriate number of suitably sized openings to allow a plurality of linking members 26 to pass through and extend outwardly from the second housing portion second end 48.

The internal energy absorbing member 24 may be disposed within the concentric first housing portion 38 and the second housing portion 40. The energy absorbing member 24 may generally longitudinally span between the first housing portion first end 42 and the second housing portion second end 48 (i.e., between the crushing member 20 and the stopping member 22). The energy absorbing member 24 may include a first (e.g., upper) end 80 and a longitudinally opposed second (e.g., lower) end 82. The energy absorbing member first end 80 may be in contact with the crushing member 20. The energy absorbing member second end 82 may be in contact with the stopping member 22. In an example embodiment, the stopping member 22 may include an inwardly extending lip 84 of the second housing portion second end 48. The lip 84 may be defined by an area between the second housing sidewalls 70 and the second housing portion second end opening, for example, the lip 84 may be an annular protrusion extending perpendicularly inward from the sidewalls 70, an end cap attached to the second housing portion second end 48, or the like.

In the illustrated embodiment, the energy absorbing member 24 may be an energy absorbing tube formed from a mixture of fibers and resins (i.e., composite material). The fibers may provide the energy absorbing member 24 the necessary strength to function as an energy absorber and the resin (i.e., matrix) may hold the fibers together and distribute any applied loads to the fibers. Examples of fibers for use in the energy absorbing member 24 may include graphite, Kevlar, fiberglass, boron, and the like. Either thermoset or thermoplastic resins may be mixed with the fibers during construction of the energy absorbing member 24. The orientation of the fibers may affect the energy absorbing characteristics of the energy absorbing member 24. The fiber orientation may include various combinations of unidirectional fibers oriented at angles of zero degrees to ninety degrees with respect to the longitudinal axis X of the energy absorbing tube 24. As a non-limiting example, the energy absorbing member 24 (i.e., composite tube) may be an energy-absorbing graphite-epoxy tube. In an example embodiment, the energy absorbing tube 24 may absorb approximately 160 J/g of specific energy when axially crushed under quasi-static loading conditions. It can be appreciated by one skilled in the art that the energy absorbing member 24 may also include any suitable spring material that may attenuate or absorb energy upon compression and may not be limited to a tubular structure.

Figure 8:
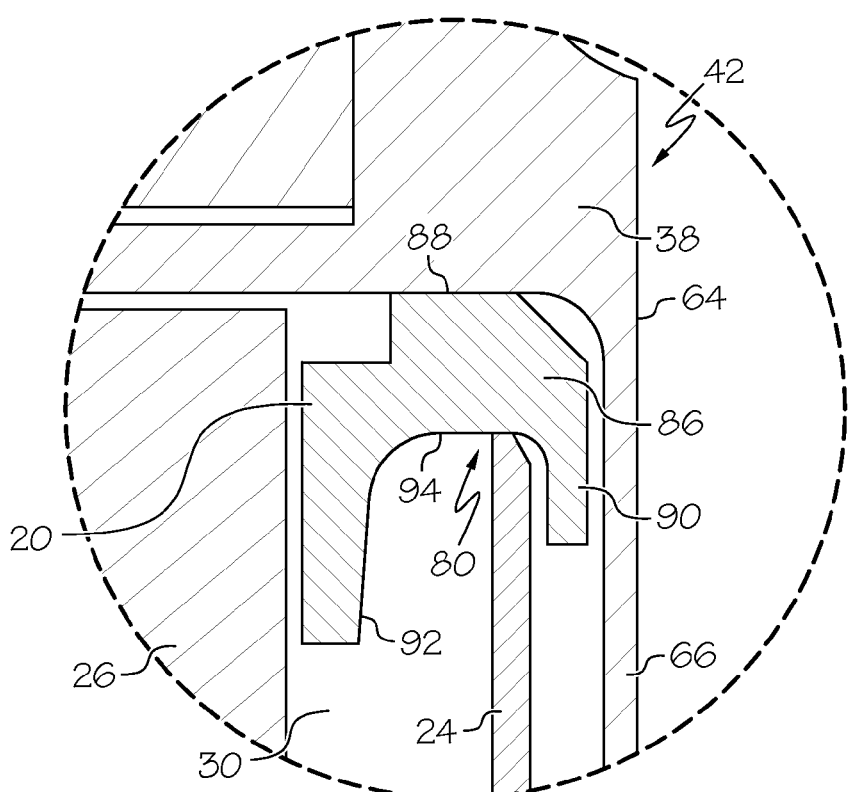
FIG. 8 is a close-up cross-sectional view of the disclosed energy absorbing device of FIG. 7 depicting a crushing interface.

Referring to FIG. 8, in an example embodiment, the crushing member 20 may be a crush cap including a body 86 having a rear surface 88 for contact with the first housing portion first end 42. The rear surface 88 may be flat or otherwise suitably shaped for flush contact with the interior of the first housing portion first end 42. The crushing member 20 may generally span between the inner diameter of the first housing body 64 such that a perimeter edge 90 may be in close tolerance to the first housing sidewalls 66, such that the crushing member 20 may move within the first housing portion 38 similar to a piston. The linking member 26 may be attached to a center of the member 20. A front surface 92 of the crushing member 20 may include an annular recess or groove 94 proximate the perimeter edge 90.

In one embodiment of the disclosed device 10, the first end 80 of the energy absorbing member 20 may be positioned within the groove 94 of the crushing member 20. A chamfer may be machined on the energy absorbing member first end 80 for contact with the curved surface of the groove 94. The chamfered first end 80 may act as a trigger that initiates progressive collapse of the energy absorbing member 20 and forces the energy absorbing member 20 to collapse inwards along the curve of the groove 94 in order to increase the level of energy absorption, versus an outward or random collapse as would be typical without a contoured or grooved crushing member 20.

Figure 9:
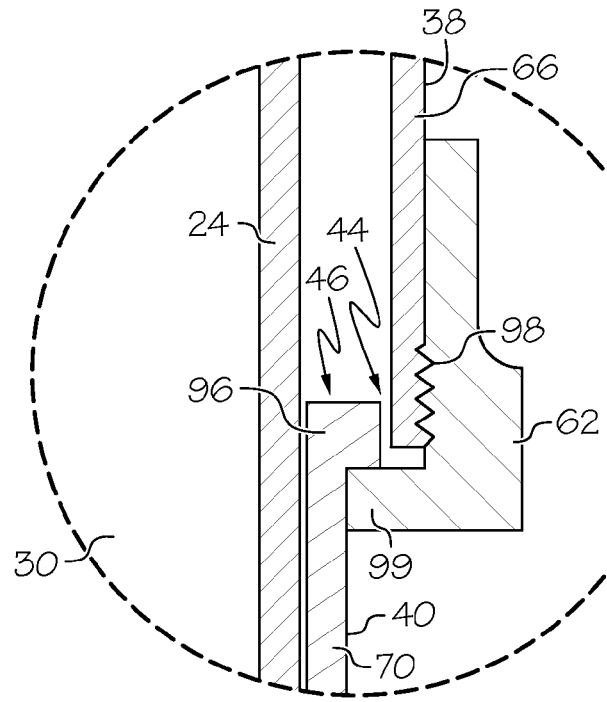
FIG. 9 is a close-up cross-sectional view of the disclosed energy absorbing device of FIG. 7 depicting a coupling interface.

Referring to FIG. 9, the second housing portion first end 46 may include an outwardly extending flange 96. The flange 94 may nest against in interior surface of first housing sidewalls 66 about the second end 44. The first housing sidewalls 66 about the second end 44 may include a threaded exterior surface 98. The threaded flanged coupling 62 may threadably attach to the first housing portion second end 44 to connect the first housing portion 38 and the second housing portion 40 together. A flanged end 99 of the flanged coupling 62 may contact the flange 96 of the second housing portion first end 46. This configuration allows concentric axial movement of the first housing portion 38 and the second housing portion 40 (i.e., the first end 16) when loaded in compression (i.e., a compression stroke) (FIG. 11) and correspondingly locks the second housing portion 40 to the first housing portion 38 (e.g., to prevent over extension of the second housing portion 40) when loaded in tension (i.e., a tension stroke) (FIG. 12).

Figure 10:
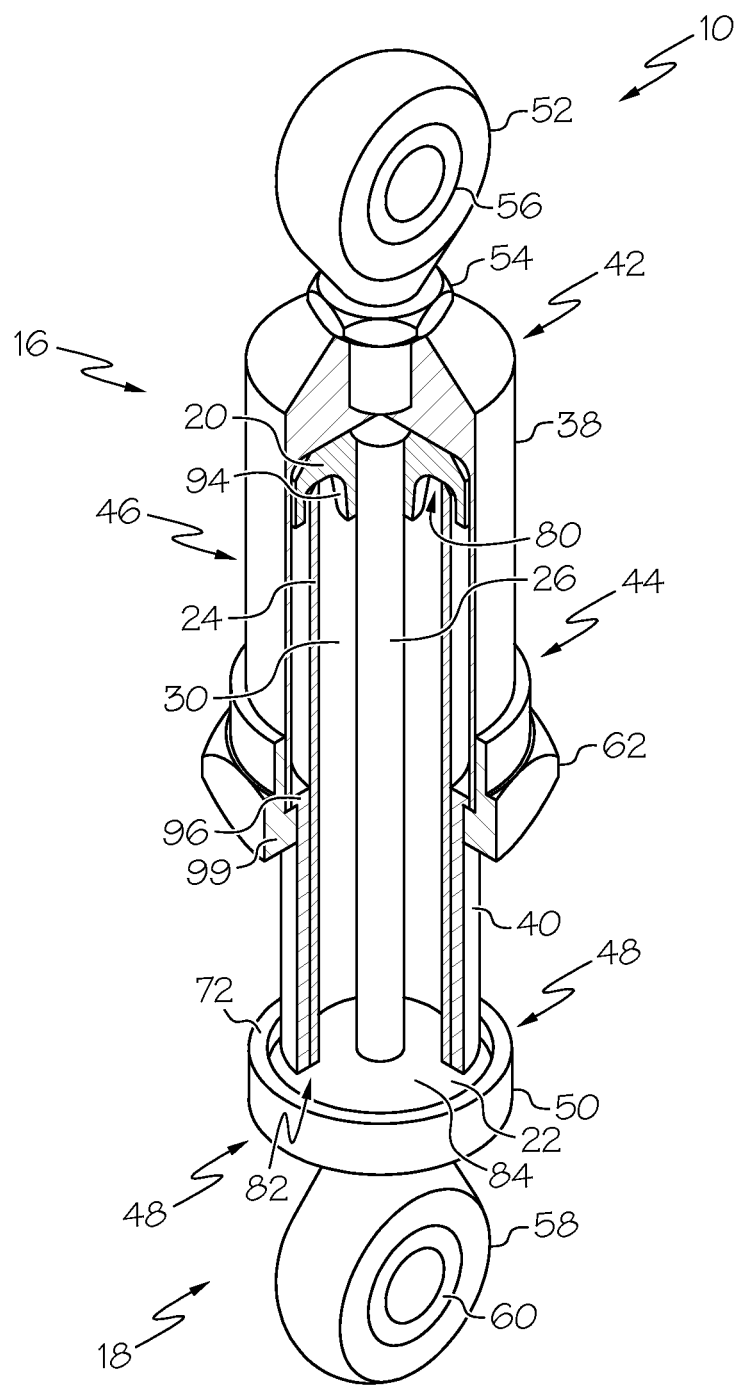
FIG. 10 is a cut away view of the disclosed energy absorbing device of FIG. 4.
Figure 11:
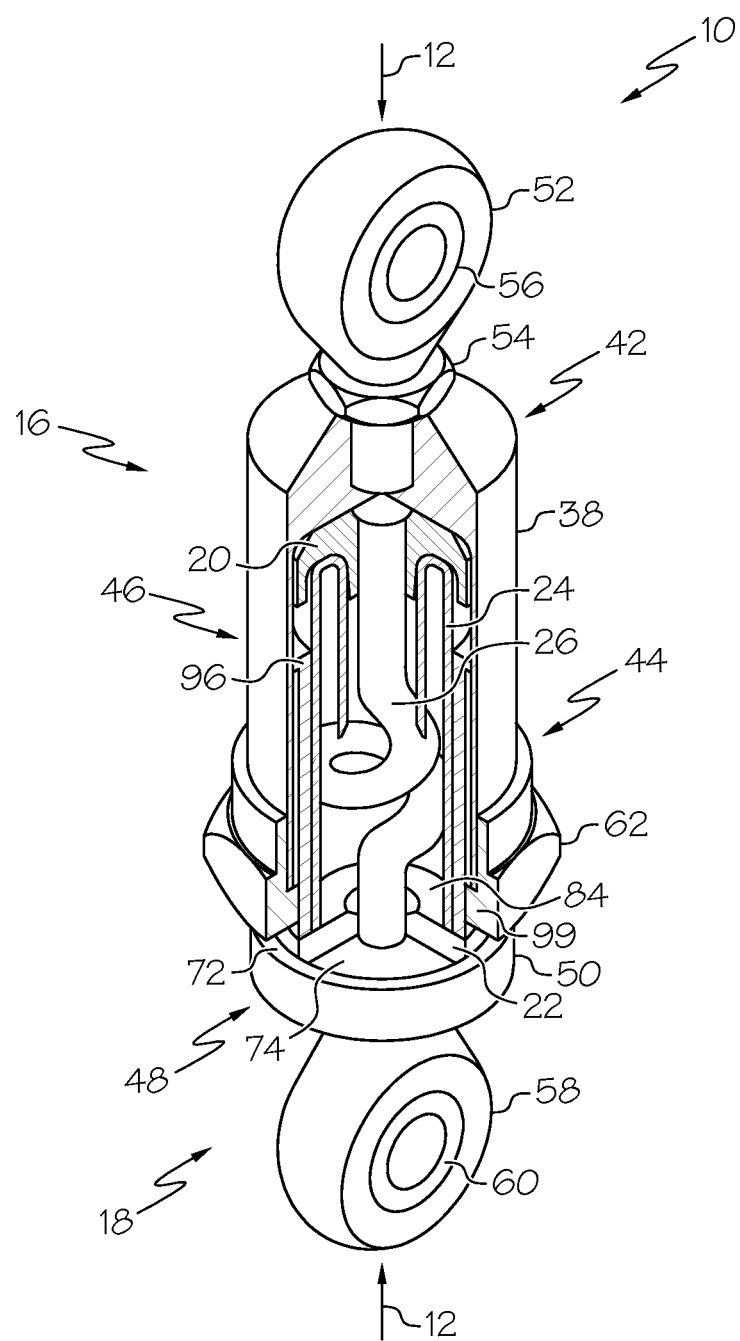
FIG. 11 is a cut away of the disclosed energy absorbing device of FIG. 5.
Figure 12:
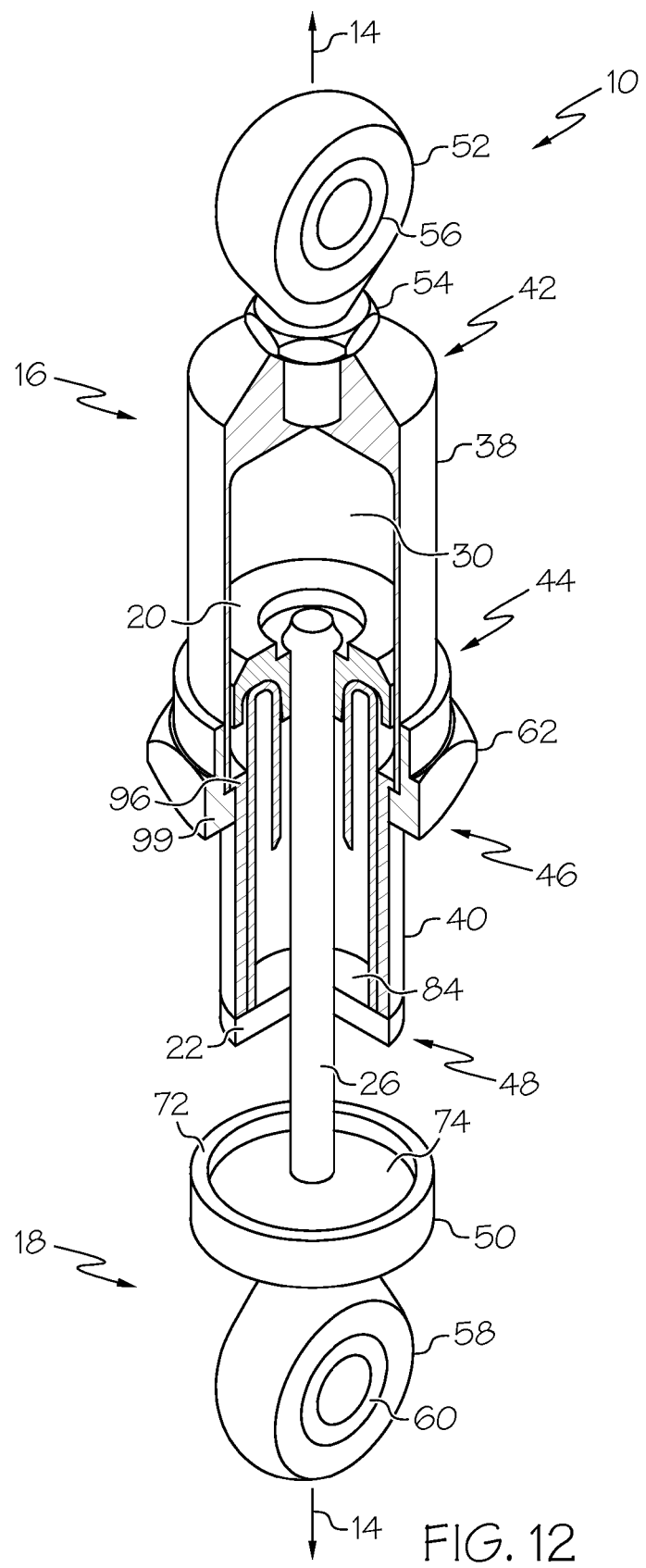
FIG. 12 is a cut away view of the disclosed energy absorbing device of FIG. 6.

Referring to FIG. 10-12, which diagrammatically illustrate the force attenuation provided by the device 10 when acted upon and absorbing energy in response to a compression force 12 (FIG. 11) (i.e., the compression stroke) and to a tension force 14 (FIG. 12) (i.e., the tension stroke). The energy absorbing member 20 may be axially crushed in compression between the crush member 20 and the lip 84 (i.e., the stopping member 20), regardless of whether the forces imparted on the device 10 are in the compression 12 (FIG. 11) or tension 14 (FIG. 12) directions.

When the device 10 is in an unloaded state (FIG. 10), the crushing member 20 may be positioned proximate the first housing portion first end 42; the second housing portion 40 may extend outwardly from the first housing portion second end 44, such that the flange 96 of the second housing portion first end 46 is in contact with the flanged end 99 of the flanged coupling 62; the second housing portion second end 48 may be in releasable contact with the end fitting 50; the energy absorbing member first end 80 may be in contact with the groove 94 of the crushing member 20; and the energy absorbing member second end 82 may be in contact with the lip 84 (i.e., stopping member 22) of the second housing portion second end 48.

When the device 10 is loaded in compression (FIG. 11) the first housing portion 38 and second housing portion 40 may move together in relation to one another (i.e., the second housing portion 40 may stroke inwardly within the first housing portion 38), thus forcing the energy absorbing member first end 80 against the crushing member groove 94 as the second housing portion second end 48 (i.e., the stopping member 22) moves toward the crushing member 20. The crushing member 20 may remain stationary about the first housing portion first end 42, for example by the physical motion limitation provided by the closed first housing portion first end 42. The energy absorbing member first end 80 may begin to collapse inwardly as the energy absorbing member 24 is crushed in compression, thus absorbing energy as the remaining body of the energy absorbing member 24 collapses following the arc of the groove 94 as the crushing member 20 and the lip 84 (i.e., stopping member 22) are driven toward one another by the compression force 12. The linking member 26 may have a flexible body to collect within the internal volumes 30 of the housings 38, 40 during compression.

When the device 10 is loaded in tension (FIG. 12), the crushing member 20 may stroke, similar to a piston, within the first housing portion 38 from proximate the first housing portion first end 42 toward proximate the first housing portion second end 44 in response to being pulled on by the linking member 26. The flanged coupling 62 may prevent the second housing portion 40 from over stroking out of the first housing portion 38 through contact of the flange 96 and the flanged end 99 of the flanged coupling 62. The energy absorbing member first end 80 may begin to collapse inwardly as the energy absorbing member 24 is crushed in compression, thus absorbing energy as the remaining body of the energy absorbing member 24 collapses following the arc of the groove 94 as the crushing member 20 and the lip 84 (i.e., stopping member 22) are driven toward one another by the tension force 14.

Figure 13:
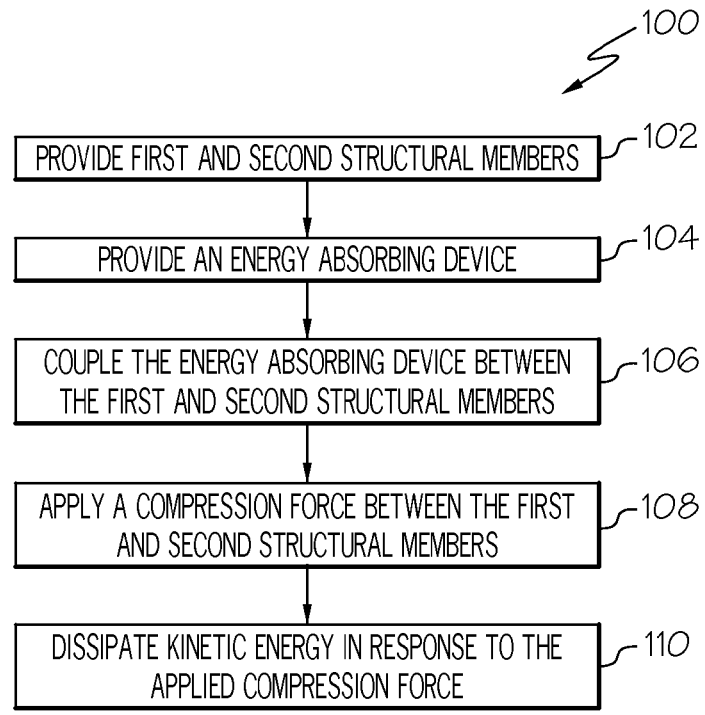
FIG. 13 is a flow chart depicted one embodiment of the disclosed method of absorbing energy in response to a compression force; and, FIG. 14 is a flow chart depicting one embodiment of the disclosed method of absorbing energy in response to a tension force.

Referring to FIG. 13, also disclosed is a method 100 of absorbing energy in response to a compression force. The method may begin at Block 102 with the step of providing a first and second structure member. At Block 104, at least one energy absorbing device may be provided. The energy absorbing device may include a first housing portion having a first end and a second end, a second housing portion connected to the first housing portion, the second housing portion having a first end inserted within the second housing portion and a second end, a crush cap movably disposed within the first housing portion, an end fitting removably connected to the second housing portion, a tension cable attached between the crush cap and the end fitting, and an energy absorbing member disposed within the housing and extending between the crush cap and the second housing portion second end. At block 106 the energy absorbing device may be coupled between the first and second structure members. At Block 108 a compression force may be applied between the first and second structural members. At Block 110 the energy absorbing device may dissipate kinetic energy in response to the compression force by urging the second housing portion into the first housing portion such that the energy absorbing member may be crushed between the crush cap and the second housing portion second end.

Figure 14:
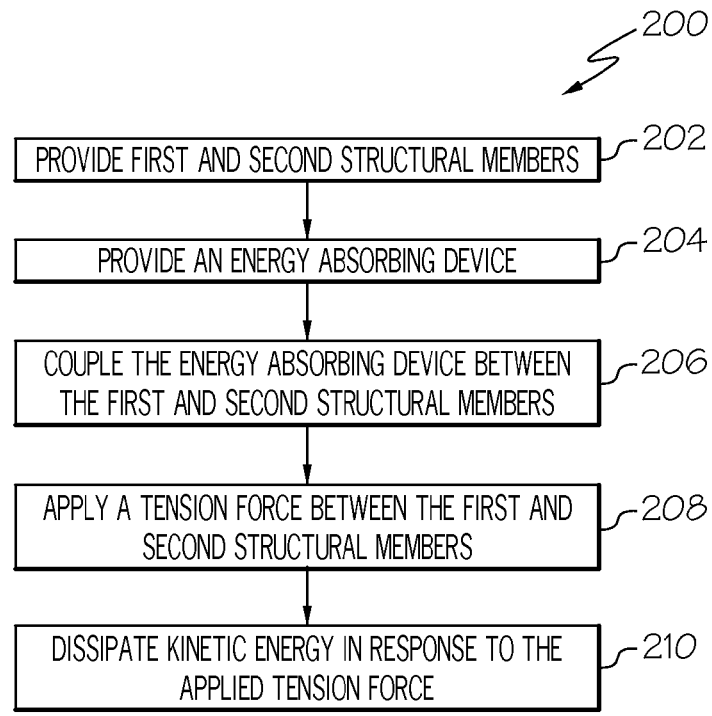

Referring to FIG. 14, also disclosed is a method 200 of absorbing energy in response to a tension force. The method may begin at Block 202 with the step of providing a first and second structure member. At Block 204, at least one energy absorbing device may be provided. The energy absorbing device may include a first housing portion having a first end and a second end, a second housing portion connected to the first housing portion to form a housing, the second housing portion having a first end inserted within the first housing portion second end and a second end, a crush cap movably disposed within the housing, an end fitting removably connected to the second housing portion, a tension cable attached to the crush cap and the end fitting, and an energy absorbing member disposed within the housing and extending between the crush cap and the second housing portion second end. At block 206 the energy absorbing device may be coupled between the first and second structure members. At Block 208 a tension force may be applied between the first and second structural members. At Block 210 the energy absorbing device may dissipate kinetic energy in response to the tension force by urging the crush cap toward the inner housing second end such that the energy absorbing member may be crushed between the crush cap and the inner housing second end.

An example use would be to attach one or more devices 10 to an aircraft crashworthy seat to permit energy attenuation in both the forward, aft, and lateral directions. In such an example of use, the benefits may be an increase in survivability for the occupant and a weight savings provided through a single mechanism with the ability to absorb energy in two directions (i.e., compression and tension). Other examples of potential applications of use for the device 10 may include energy-absorbing seats within ground vehicles, crash retention of high-mass items within aircraft, land vehicle frame-to-chassis mounting, automotive bumper mounting, aircraft landing gear secondary crush structure, and the like.

Although various embodiments of the disclosed energy absorbing device have been shown and described, modifications may occur to those skilled in the art upon reading the specification. The present application includes such modifications and is limited only by the scope of the claims.

What is claimed is:

1. An energy absorbing device comprising:
a housing comprising a first end and a second end longitudinally opposed from said first end;
a crushing member positioned proximate said first end, wherein said crushing member is longitudinally moveable away from said first end;
a stopping member longitudinally spaced apart from said crushing member, wherein said stopping member is longitudinally moveable toward said first end;
an energy absorbing member positioned between said crushing member and said stopping member; and
a linking member connected to said crushing member, wherein said energy absorbing member is destructively crushed between said crushing member and said stopping member when said crushing member and said stopping member move together in response to a compression force or a tension force.

2. The device of claim 1 wherein said energy absorbing member comprises a composite material.

3. The device of claim 1 wherein said housing defines an internal volume, and wherein said crushing member, said stopping member and said energy absorbing member are received in said internal volume.

4. The device of claim 3 wherein said housing comprises a first housing portion and a second housing portion.

5. The device of claim 1 wherein said crushing member comprises an annular groove comprising a curved surface, and wherein said energy absorbing member comprises a chamfered first end in contact with said curved surface of said annular groove and a second end in contact with said stopping member.

6. The device of claim 5 wherein said energy absorbing member progressively collapses by directing said first end of said energy absorbing member toward said second end of said energy absorbing member and deforming said absorbing member in an inwardly curved direction guided by said curved surface of said annular groove when said crushing member and said stopping member move together in response to said compression force or said tension force.

7. An energy absorbing device comprising:
a housing comprising a first end longitudinally opposed from a second end and defining an internal volume;
a longitudinally moveable crushing member received in said internal volume proximate said first end;
a longitudinally moveable stopping member received in said internal volume proximate said second end;

an end fitting in releasable contact with said stopping member proximate said housing second end;

a linking member comprising a first end longitudinally opposed from a second end, wherein said first end of said linking member is connected to said crushing member, and wherein said second end of said linking member is connected to said end fitting; and a tubular energy absorbing member received in said internal volume, said energy absorbing member extending between said crushing member and said stopping member, wherein said energy absorbing member is destructively crushed between said crushing member and said stopping member when said crushing member and said stopping member move together in response to a compression force or a tension force.

8. The device of claim 7 wherein said energy absorbing member comprises a composite material.

9. The device of claim 7 wherein said housing comprises a first housing portion and a second housing portion.

10. The device of claim 9 wherein said energy absorbing member is crushed between said crushing member and said stopping member when said first housing portion moves relative to said second housing portion in response to said compression force.

11. The device of claim 9 wherein said energy absorbing member is crushed between said crushing member and said stopping member when said first housing portion moves relative to said second housing portion in response to said tension force.

12. The device of claim 7 wherein said crushing member comprises an annular groove comprising a curved surface, and wherein said energy absorbing member comprises a first end in contact with said curved surface of said annular groove and a longitudinally opposed second end in contact with said stopping member.

13. The device of claim 12 wherein said energy absorbing member first end is chamfered, and wherein said energy absorbing member progressively collapses by directing said first end of said energy absorbing member toward said second end of said energy absorbing member and deforming said absorbing member in an inwardly curved direction guided by said curved surface of said annular groove when said crushing member and said stopping member move together in response to said compression force or said tension force.

14. A method of absorbing energy in response to a load force, said method comprising the steps of:

providing a first structural member;

providing a second structural member;

providing an energy absorbing device comprising:

a housing comprising a first end and a second end longitudinally opposed from said first end;

a crushing member positioned proximate said first end, wherein said crushing member is longitudinally moveable away from said first end;

a stopping member longitudinally spaced apart from said crushing member, wherein said stopping member is longitudinally moveable toward said first end;

a tubular energy absorbing member positioned between said crushing member and said stopping member; and a linking member connected to said crushing member;

coupling said energy absorbing device between said first and said second structural members;

moving said crushing member and said stopping member together in response to a compression force or a tension force; and absorbing energy by destructively crushing said energy absorbing member between said crushing member and said stopping member when said crushing member and said stopping member move together in response to said compression force or said tension force.

15. The method of claim 14 wherein destructively crushing said energy absorbing member between said crushing member and said stopping member comprises progressively collapsing said energy absorbing member by deforming said absorbing member in an inwardly curved direction.

* * * * *